INVENTOR.
Eugene J. Houdry

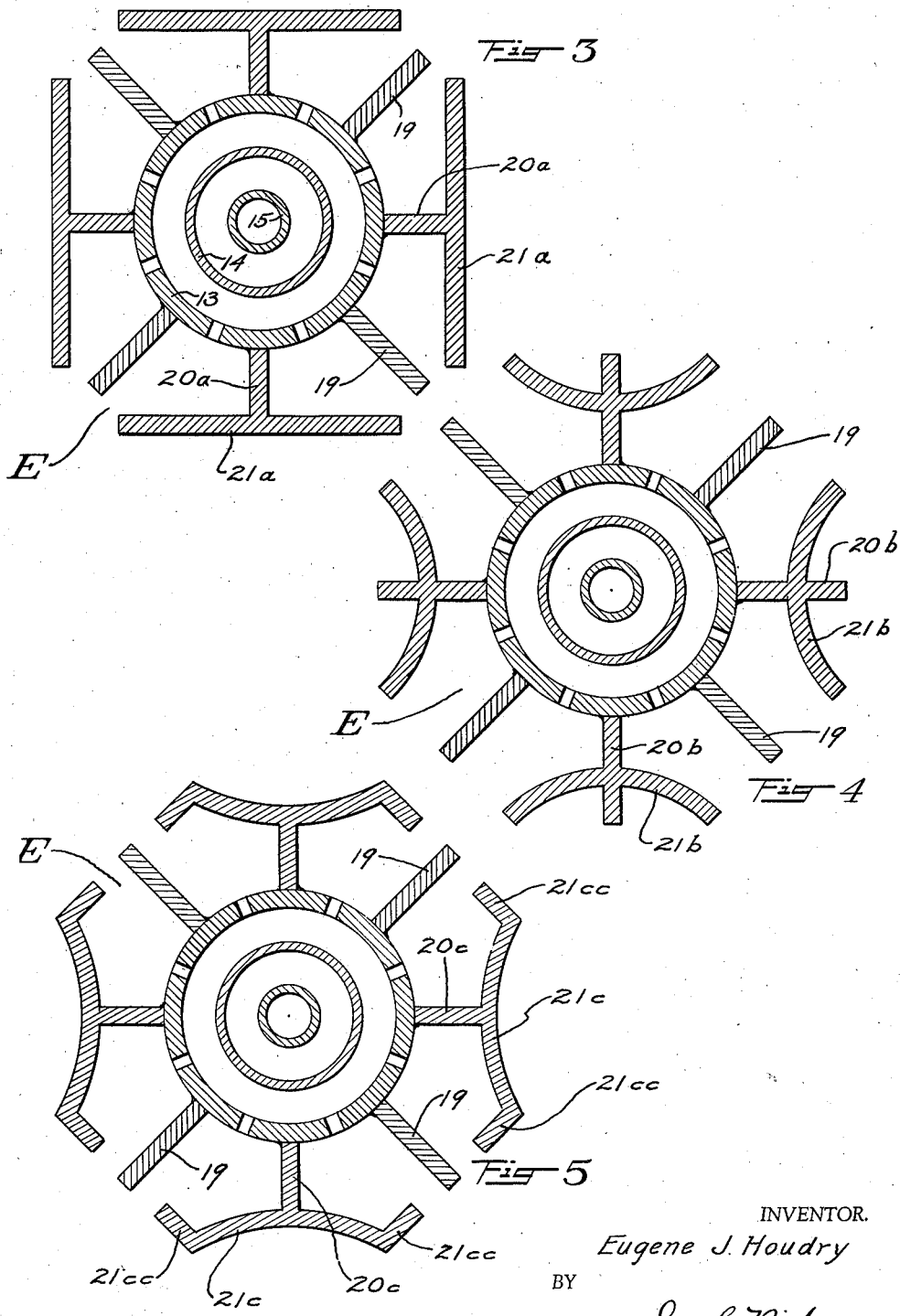

Patented May 4, 1937

2,078,948

UNITED STATES PATENT OFFICE 2,078,948

CONTROL OF EXOTHERMIC REACTIONS

Eugene J. Houdry, Philadelphia, Pa., assignor to Houdry Process Corporation, Dover, Del., a corporation of Delaware Application February 13, 1935, Serial No. 6,291

17 Claims. (Cl. 23—288)

This invention relates to chemical reactions taking place in the presence of contact masses which may be absorbent, adsorbent, mere spreading material or which enter chemically into the reaction. More particularly it has to do with strongly exothermic reactions such as those involved in the catalytic synthesis of ammonia, of $SO_3$, in the regeneration or reactivating by oxidation of contact masses contaminated by coky, tarry and sulphurous deposits after use in the treatment or conversion of mineral oils, etc. The invention involves both process and apparatus aspects.

One object of the invention is to remove the excess heat of the reaction in a uniform manner so as to maintain the entire contact mass within a predetermined temperature range. Another object is to remove the heat at a rapid rate and in large quantity. Another object is to improve the distribution of reactants within the contact mass. Another object is to devise suitable apparatus for accomplishing the above results. Still other objects will be apparent from the detailed description which follows.

The invention utilizes two media to take out undesirable or excess heat of the reaction, preferably in a definite proportional arrangement. One medium may be the entering reactant fluids, while the other is an independent fluid whose sole function is the transfer of heat. Uniform distribution of reactant fluids and removal of reactant products may be effected by two series of perforated conduit elements embedded in the contact mass after the manner disclosed in my copending application, Serial No. 611,362, filed May 14, 1932 which issued as Patent No. 2,042,468 on June 2, 1936. The independent cooling fluid may be passed through the reaction chamber for indirect heat exchange with the contact mass by a plurality of imperforate conduits disposed within the series of perforated outlet conduits by which the fluid products are removed as disclosed in the copending application of myself and R. C. Lassiat, Serial No. 728,544. filed June 1, 1934. Suitable means are provided to form heat conducting channels within the contact mass so as to control the manner and extent of heat absorption by the heat removing media. Such means may take the form of fins radiating from the conduits of both series into the mass. Certain of the fins are shaped and disposed so as to improve the distribution or dispersion of the fluid reactants within the contact mass.

In order to illustrate the invention and the manner of its operation, one concrete embodiment with certain modifications of apparatus details is shown in the accompanying drawings, in which:

Figs. 3, 4 and 5 show, in transverse section on a still larger scale, various modifications of the fin arrangement of the outlet conduits.

Figure 1:
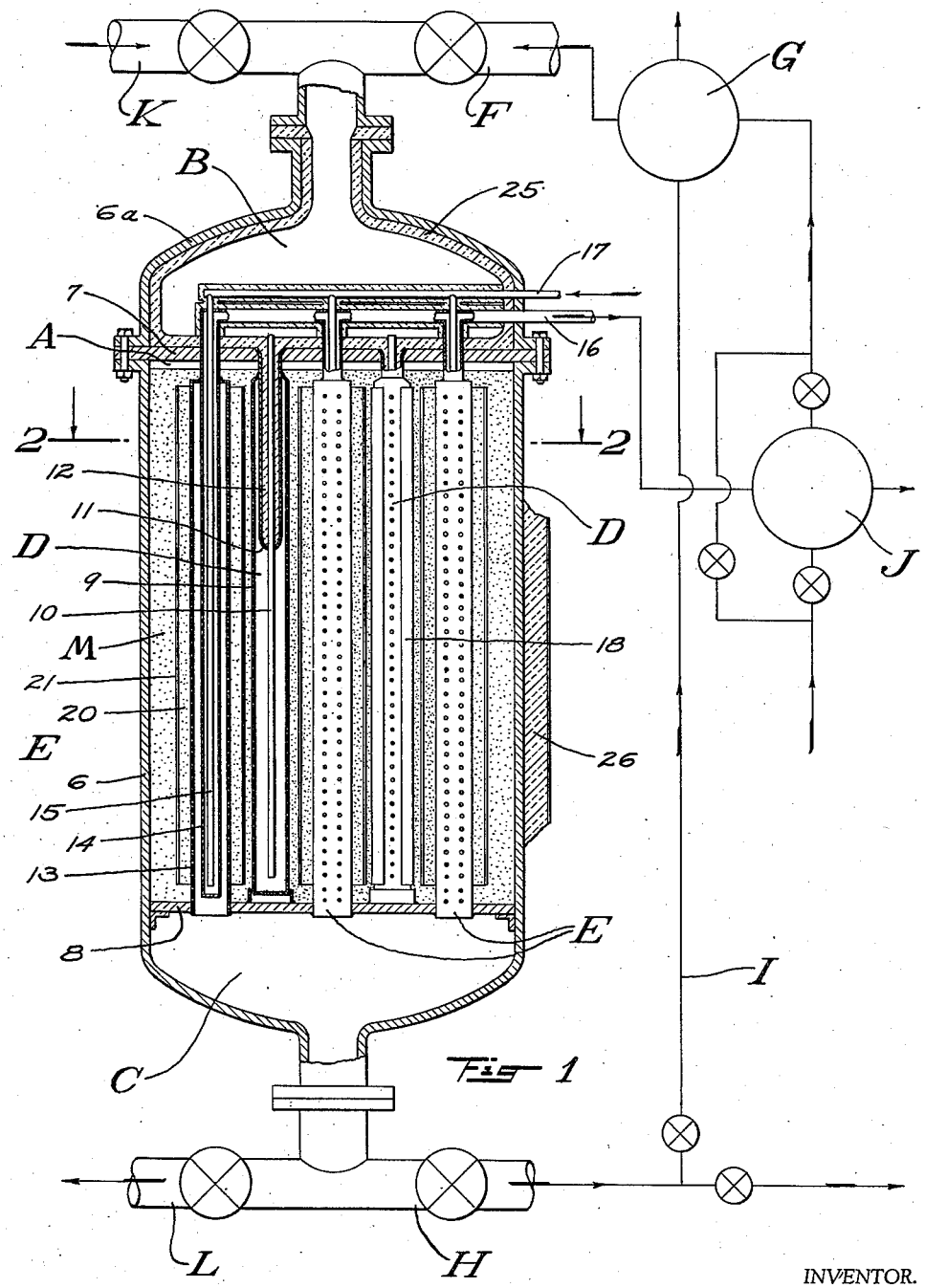
Fig. 1 is a vertical sectional view of a converter, substantially on line 1—1 of Fig. 2, showing certain parts in elevation, a number of fins being omitted for the sake of clearness.
Figure 2:
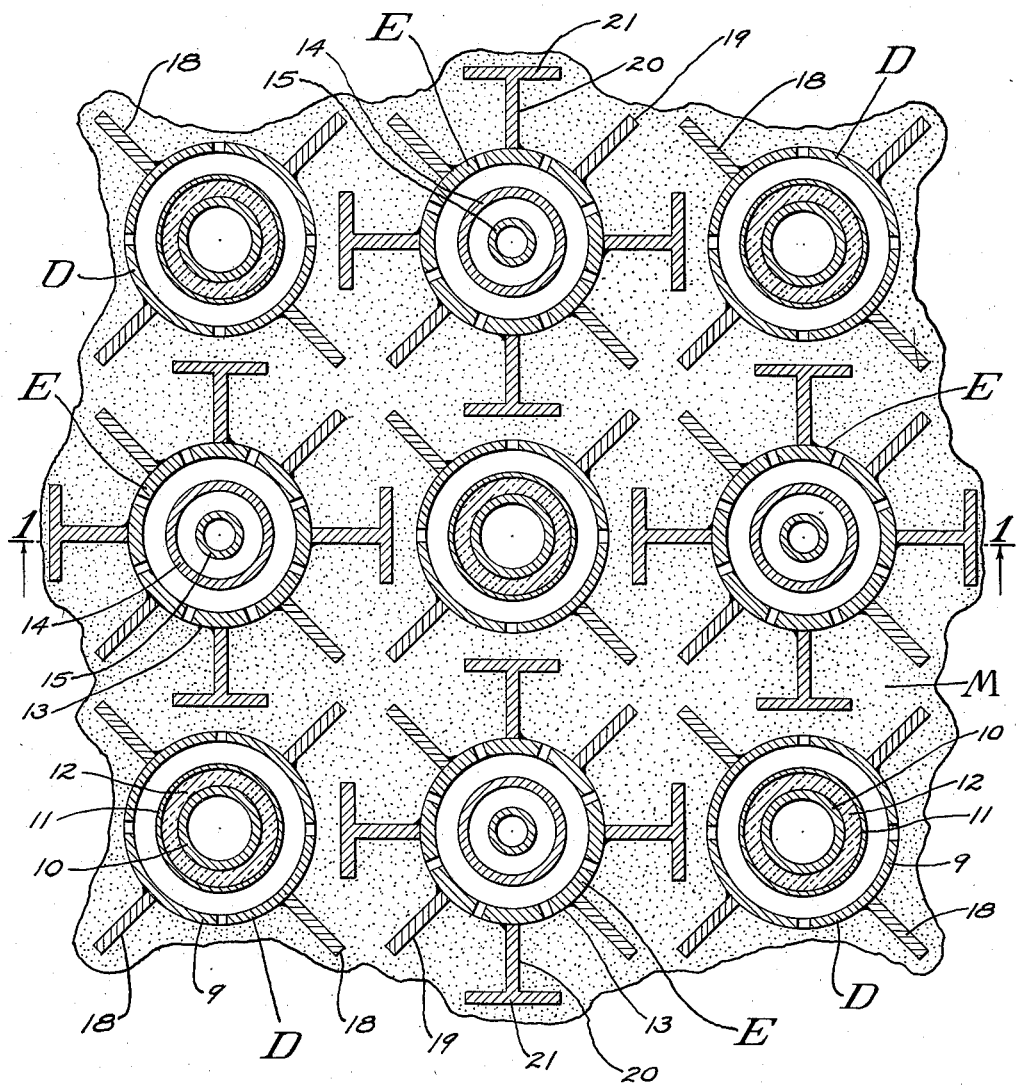
Fig. 2 is a transverse sectional view on an enlarged scale of the interior of the converter substantially on the line 2—2 of Fig. 1.

The converter shown in Fig. 1 is made up of an outer casing or shell 6 having a detachable cover 6a and providing therewithin a large central reaction chamber A and upper and lower end or manifold chambers B and C, respectively, defined by upper and lower partitions or flue sheets 7 and 8. Mounted on upper flue sheet 7 to extend within the reaction chamber A and to be embedded in contact mass M which substantially fills the chamber is a series of fluid conducting or distributing elements D, each of which comprises an outer perforated conduit 9 and a smaller supply conduit 10 which extends within conduit 9 in spaced, nested or telescoped relation. A sleeve 11 encloses inner supply conduit 10 for a portion of its length and serves to connect the two nested conduits, outer conduit 9 being closed at its upper end where it joins sleeve 11. The latter may be filled with heat insulating material 12 to restrict heat transfer for a predetermined distance between conduits 9 and 10. A second series of fluid conducting or outlet elements E are mounted on lower tube sheet 8 to extend upwardly into reaction chamber A and to be embedded in contact mass M in spaced symmetrical arrangement with one another and with distributing series D as indicated in Fig. 2. Outlet elements E comprise outer perforated conduits 13 closed at their upper ends and with lower open ends to discharge reaction products from chamber A into lower manifolding chamber C. A heat exchange member in the form of an imperforate conduit 14 which encloses an inner supply conduit 15 is mounted within each conduit 13 to extend the full length of the latter in spaced telescoped relation. Each conduit 14 projects through the closed end of conduit 13 and through upper flue sheet 7 to connect with an outlet manifold 16 leading out of the converter while each inner supply conduit 15 continues beyond and projects through manifold 16 to connect with supply conduit 17.

To assure an adequate and predetermined degree of heat transfer between distributing elements D and contact mass M and between the outlet elements E and the contact mass, both series of elements are provided with heat conducting members or fins which radiate out into the mass as indicated most clearly in Fig. 2. Outer conduits 9 of distributing series D are provided with four straight axially disposed fins 18 in symmetrical arrangement, 90° apart. Conduits 13 of outlet series E also have four straight axially disposed fins 19 similar to those on the distributing series and similarly mounted, and, in addition, have a second series of fins 20 which are arranged to alternate with fins 19. Fins 20 are enlarged at their outer ends by laterally extending portions 21 so as to provide an area of contact surface substantially twice that of either fins 18 or 19. Thus outlet elements E present a considerably greater area of contact with mass M than the distribution series D.

As clearly shown in Fig. 2, the members of distributing series D and of outlet series E are mounted in reaction chamber A in such a way that fins of the same type on the members of the same series are in alignment, thereby dividing contact mass M into a series of smaller masses of substantially the same size and shape and having an identical arrangement of heat conducting surfaces associated therewith and an identical arrangement of ports for supplying reactant fluids and for removing reactant products, thus assuring so far as possible uniformity of operating conditions throughout contact mass M. It is particularly to be noted that the transverse outer ends 21 of fins 20 of outlet series E are disposed directly in front of the perforations in outer conduits 9 of distributing series D thereby serving to baffle and effect dispersion of the streams of the entering reactant fluids throughout the portions of the contact mass inclosed by adjacent fins 18 and 19 of both series of conduits; in other words, this arrangement is intended to prevent, so far as possible, direct movement of reactants from the perforations in conduits 9 to the perforations in outlet conduits 13.

In order partially to control a strong exothermic reaction, the reactant fluids will be admitted to manifolding chamber B, as by valved line F, at any desired temperature below that of the reaction. To prevent heat exchange with the converter shell, the interior of manifolding chamber B may be covered or lined by an insulating layer 25 which may join with or serve as an upper cover for the heat insulating material 12 which fills sleeves 11 of distributing series D. Also, those portions of manifolds 16 and 17 which extend within upper manifold chamber B may be incased in heat insulating material as indicated. Thus the cool reactant fluids will absorb little or no heat before they actually pass into supply conduits 10 of distributing series D. The reactants will then pick up heat from mass M by radiation and convection through contact with the walls of conduits 10 and 9 until they pass through the perforations of the latter into mass M. At that time they will be at a sufficiently high temperature to enable the reaction to continue and will have removed a predetermined quantity of the heat of reaction. The remainder of the undesirable heat is absorbed and removed by the independent heat exchange means associated with outlet series E through which a suitable heat exchange medium is circulated, preferably a vaporizable liquid such as water, mercury, or diphenyl. The liquid enters through supply conduit 17, passes in a plurality of streams through inner conduits 15 to discharge into the lower ends of the outer conduits 14, and then passes in reverse flow to discharge into outlet manifold 16. Thus heat is withdrawn from the reaction chamber by direct contact of the reaction products with conduits 14 of the cooling system and by radiation between the latter and conduits 13 which, in turn, receive heat from those parts of the contact mass which are directly against the walls of the conduit and by the heat conducting channels provided by fins 19 and 20 from more remote portions of the mass.

It will, accordingly, be apparent that by a suitable arrangement of distributing and outlet elements provided with heat conducting members or fins of suitable number, extent and disposition, any desirable degree of proportional movement of heat (within the limits set by the type of reaction and apparatus used) may be effected to the entering reactant fluids on the one hand and to a separate and independent cooling medium on the other. For a strongly exothermic reaction such as the regeneration by oxidation of a contact mass which has been used for the conversion of hydrocarbons and is contaminated by a deposit of a coky and tarry nature, the apparatus shown in Fig. 1 will permit the oxidizing fluid comprising or containing air to be admitted at atmospheric temperature and to pick up heat within distributing elements D so as to enter the mass at a temperature of the order of 750 to 900° F., which is high enough to avoid impairment or checking of the oxidizing reaction. If the mass is to be held at a temperature of about 1050° F., water under pressure will be circulated through the cooling system comprising elements 17, 15, 14, and 16 at a suitable rate after oxidation has begun and when the temperature of the mass approaches the desired or maximum level. A preponderance of the heat will be withdrawn by the cooling system, namely, 60% or more, while the amount withdrawn by the entering reactants or oxidizing medium will vary from 20 to 40% depending largely upon the temperature at which such medium is supplied.

If found necessary or advisable, the reactants may be somewhat raised in temperature by passing them through a heat exchanger such as G to which a part of the reactant products which leave through valved connection H may be diverted by the valved line indicated at I. Similarly or alternately, the reactant fluids may be heated by sending them through exchanger J in heat exchange relation with the heated cooling medium leaving the converter by manifold 16.

The converter shown in Fig. 1 can also be used for endothermic reactions, as, for example, in the conversion or treating of hydrocarbons, in which instance the reactant fluids will be supplied to manifolding chamber B at the reaction temperature or slightly thereabove by valved supply line K, and the transformed products will leave manifold chamber C through valve connection L. In such a case the independent heat exchange circuit could be reversely operated and utilized to supply heat to the contact mass. The movement of heat would then be by radiation from conduits 14 to conduits 13 of the outlet series and thence by conduction through fins 19 and 20 thereon into the contact mass to supply the heat required to maintain the reaction. The entire exterior of the converter and the connections thereto may be heavily lagged with heat insulating material as indicated at 26 (Fig. 1).

Figs. 3, 4 and 5 show modifications of the fin arrangement on the members of the outlet series E when a contact area greater than that provided by the fins illustrated in Fig. 2 is needed or desired. This is accomplished in Fig. 3 by making transverse portion 21a of fin series 20a much longer than the corresponding part in Fig. 2. However, the increased surface area is not as great as might at first appear because the web portion 20a of the fin has been shortened as compared with 20 of Fig. 2. In Fig. 4, fin 20b is of the same relative projection as 20 of Fig. 2, but it has an arcuate member or portion 21b intersecting fin 20b intermediate the ends of the latter and extending well beyond on both sides to terminate in line with the outer ends of adjacent straight fins 19. In Fig. 5, fin 20c does not extend beyond the intersecting arcuate portion 21c, as shown in Fig. 4, and, instead, straight extensions 21cc are added at the ends of arcuate section 21c to line up with similar extensions on the nearest arcuate members, the outer faces of such extensions being in line with the ends of the adjacent straight fins 19. Obviously, other modifications can be devised to effect the same or a different degree of pick-up of heat by conduits which embody an independent heat exchange medium, but those shown have been found to give satisfactory operation with the indicated arrangement of distributing and outlet elements.

While the invention has been herein disclosed as embodied in certain preferred forms, it is to be understood that the invention is not limited to the specific details of such forms but covers all changes, combinations, modifications and adaptations within the scope of the appended claims.

I claim as my invention:

1. In the control of exothermic reactions effected by the aid of a bed or mass of contact material confined within a reaction zone, the operative process which comprises feeding streams of reactant fluids to the mass at a temperature below the desired temperature of reaction, passing a heat-exchange fluid in a plurality of streams through the mass in heat exchange relation therewith, but out of direct heat-conducting relation therewith, and maintaining a multiplicity of heat-conducting channels all through the mass, said channels being arranged and distributed with relation to said streams of reactant fluids and said streams of heat-exchange fluid so as to direct a preponderance of the excess heat of reaction to the last-mentioned streams.

2. In the control of exothermic reactions effected by the aid of a bed or mass of contact material confined within a reaction zone, the operative process which comprises feeding streams of reactant fluids to the mass at a temperature below the desired temperature of reaction, passing a heat-exchange fluid in a plurality of streams through the mass in heat-exchange relation therewith but out of direct heat-conducting relation therewith and maintaining a multiplicity of heat-conducting channels all through the mass, said channels being arranged and distributed with relation to said streams of reactant fluids and said streams of heat-exchange fluid so as to direct from 20 to 40% of the excess heat of reaction to said streams of reactant fluids and the remaining 80 to 60% thereof to said streams of heat-exchange fluid.

3. In the control of exothermic reactions effected by the aid of a bed or mass of contact material confined within a reaction zone, the operative process which comprises feeding streams of reactant fluids to the mass, passing a cooling fluid in a plurality of streams through the mass in heat-exchange relation therewith but out of direct heat-conducting relation therewith, maintaining passages for fluids surrounding the last-mentioned streams and intervening between them and the surrounding bed of contact mass, withdrawing fluid products from the reaction zone through said passages, and maintaining a multiplicity of heat-conducting channels all through the mass, said channels being arranged and distributed with relation to said streams of reactant fluids and said streams of heat-exchange fluid so as to direct a preponderance of the excess heat of reaction to the last-mentioned streams.

4. A converter for effecting exothermic reactions comprising a casing providing a reaction chamber for containing a contact mass, perforated inlet conduits extending into said chamber in symmetrical arrangement, for admitting reactants thereinto at temperatures below that of the reaction, perforated outlet conduits extending into said reaction chamber for removing the products of the reaction from said chamber, ducts associated with individual members of said outlet conduits for directing through said chamber a cooling liquid in the heat-exchange relation but out of direct heat-conducting relation with the contents of said chamber, and means associated with said inlet and outlet conduits for conducting a preponderance of the excess heat of the reaction to the last-mentioned group of conduits to be carried away by the cooling liquid which said ducts are adapted to pass and a lesser proportion thereof to said inlet conduits to be absorbed by the reactants before they are distributed into the said reaction chamber.

5. A converter for effecting exothermic reactions comprising a casing providing a reaction chamber, a contact mass therein, a series of perforated distributing conduits and a series of perforated outlet conduits embedded in said mass, means within individual members of said distributing series for admitting thereto reactants at a relatively low temperature for heat exchange with said mass before distribution therein, means associated with individual members of said outlet series for passing a cooling medium therethrough out of direct contact with said mass and with the products of the reaction, and means for directing to said last named means a preponderance of the excess heat of the reaction.

6. A converter for effecting exothermic reactions comprising a casing providing a reaction chamber, a contact mass therein, a series of perforated distributing conduits and a series of perforated outlet conduits embedded in said mass, means within members of said distributing series for admitting thereto reactants at a relatively low temperature for heat exchange with said mass before distribution therein, conducting means within members of said outlet series for an independent cooling medium, heat conducting means radiating from the members of both said series, said last named means being proportioned and arranged to conduct a preponderance of the heat of the reaction to said outlet series for absorption by said cooling medium.

7. A converter for effecting exothermic reactions comprising a casing providing a reaction chamber, a contact mass therein, a series of perforated distributing conduits and a series of perforated outlet conduits embedded in said mass, means within individual members of said distributing series for admitting thereto reactants at a relatively low temperature for heat exchange with said mass before distribution therein, conducting means within the members of said outlet series for an independent cooling medium, and fins radiating from the members of both said series into said mass, the fins on said outlet series having a greater surface area than those on said distributing series.

8. A converter for effecting exothermic reactions comprising a casing providing a reaction chamber, a contact mass therein, a series of perforated distributing conduits and a series of perforated outlet conduits embedded in said mass, means within members of said distributing series for admitting thereto reactants at a relatively low temperature for heat exchange with said mass before distribution therein, conducting means within members of said outlet series for an independent cooling medium, fins radiating from the members of said distributing series, and fins on the members of said outlet series presenting a greater surface area than said first named fins and arranged to baffle and disperse through said mass fluids issuing from said distributing series.

9. A converter for effecting exothermic reactions comprising a casing providing a reaction chamber, a contact mass therein, a series of perforated distributing conduits and a series of perforated outlet conduits embedded in said mass, means within members of said distributing series for admitting thereto reactants at a relatively low temperature for heat exchange with said mass before distribution therein, conducting means within members of said outlet series for an independent cooling medium, straight fins radiating from the members of said distributing series, and both straight and T fins radiating from said outlet series, said T fins being arranged opposite the perforations in the members of said distributing series to baffle and disperse through said mass the fluids issuing from said distributing series.

10. In apparatus for effecting chemical reactions a converter providing a reaction chamber, a contact mass therein, two series of perforated conduits extending into said mass in symmetrical arrangement to effect distribution of reactants within said mass and removal of reaction products from within said mass, heat conducting members on both said series radiating into said mass, said members on a conduit of one of said series having at least twice the surface area of those on a conduit of the other series, and a conduit for an independent heat exchange fluid within the said conduit having members of increased surface area.

11. In apparatus for effecting chemical reactions a converter providing a reaction chamber, a contact mass therein, two series of perforated conduits extending into said mass in symmetrical arrangement to effect distribution of reactants within said mass and removal of reaction products from within said mass, fins on both said series radiating into said mass and so disposed as to direct and disperse the reactant fluids all through said mass, the fins on one of said series presenting a greater surface area than those on the other series, and fluid conducting means within the conduits of said series having fins of greater area for circulating an independent heat exchange fluid.

12. In apparatus for effecting chemical reactions, a converter providing a reaction chamber, a contact mass therein, two series of perforated conduits extending into said mass in symmetrical arrangement to effect distribution of reactants all through said mass and removal of reaction products from all parts of the interior of said mass, and straight fins alternating with fins having laterally extending parts on the conduits of one of said series, said laterally extending parts being disposed directly before the perforations in the conduits of the other series so as to baffle the movement of fluids between adjacent conduits of said two series and to increase the contact of such fluids with the contact mass.

13. In apparatus for effecting chemical reactions a converter providing a reaction chamber, a contact mass therein, two series of perforated conduits extending into said mass in symmetrical arrangement to effect distribution of reactants within said mass and removal of reaction products from within said mass, straight fins radiating from said distributing series into said mass, and straight fins alternating with fins having laterally extending parts on said removal or outlet series, said laterally extending parts being disposed directly before the perforations in said distributing series so as to baffle and disperse the reactant fluids issuing therefrom.

14. In apparatus for effecting chemical reactions a converter providing a reaction chamber, a contact mass therein, two series of perforated conduits extending into said mass in symmetrical arrangement to effect distribution of reactants within said mass and removal of reaction products from within said mass, straight fins radiating from said distributing series into said mass, and straight fins alternating with fins having laterally extending parts on said removal or outlet series, the perforations in the conduits of both series being intermediate adjacent fins thereon, said series being so mounted as to dispose the straight fins of each series in alignment and the laterally extending parts of the fins on said outlet series directly before the perforations in the conduits of the distributing series.

15. A fluid conduit having perforations or openings along the length thereof and adapted to be embedded in a contact mass for controlling chemical reactions taking place therein, said conduit having two series of alternately disposed axial fins mounted on the exterior thereof for effecting heat exchange with the contact mass, the members of one series comprising straight fins while the members of the other series comprise a straight part and laterally extending parts terminating adjacent but in spaced relation to the ends of said straight fins to form wide fluid baffle surfaces as well as very large contact area for engagement with the contact mass.

16. A fluid conduit having perforations or openings along the length thereof and adapted to be embedded in a contact mass for controlling chemical reactions taking place therein, said conduit having two series of alternately disposed axial fins mounted on the exterior thereof for effecting heat exchange with the contact mass, the members of one series comprising straight fins while the members of the other series comprise a straight part intersected by an arcuate part whose ends terminate in spaced relation to the ends of said straight fins to form efficient fluid baffles and to provide areas of very large extent for contact with the contact mass for and heat exchange with the latter.

17. A fluid conduit having perforations or openings along the length thereof and adapted to be embedded in a contact mass for controlling chemical reactions taking place therein, said conduit having two series of alternately disposed axial fins mounted on the exterior thereof for effecting heat exchange with the contact mass, the members of one series comprising straight fins while the members of the other series comprise a straight part intersected by an arcuate part with angularly disposed terminal ends extending toward the adjacent straight fins to form efficient fluid baffles and to provide contact areas of very large extent with the contact mass.

EUGENE J. HOUDRY.